(12) United States Patent
Greene et al.

(10) Patent No.: US 6,243,059 B1
(45) Date of Patent: *Jun. 5, 2001

(54) COLOR CORRECTION METHODS FOR ELECTRONIC DISPLAYS

(75) Inventors: Raymond G. Greene, Ovid; Robert H. Katyl, Vestal; J. Peter Krusius; Boris Yost, both of Ithaca, all of NY (US)

(73) Assignee: Rainbow Displays Inc., Endicott, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/649,240

(22) Filed: May 14, 1996

(51) Int. Cl.[7] .................................................. G09G 3/36
(52) U.S. Cl. .............................. 345/88; 345/1; 345/4; 345/72; 345/77; 345/78; 345/150; 345/153; 345/903
(58) Field of Search ................................ 345/72, 77, 88, 345/150, 151, 152, 903, 103, 207, 153, 1, 4, 81, 154; 348/805, 807, 808, 383

(56) References Cited

U.S. PATENT DOCUMENTS

| | | | |
|---|---|---|---|
| 4,379,292 | * | 4/1983 | Minato et al. ........................ 345/154 |
| 4,409,614 | * | 10/1983 | Eichler et al. ........................ 358/530 |
| 4,825,201 | * | 4/1989 | Watanabe et al. ...................... 345/1 |
| 4,843,573 | * | 6/1989 | Taylor et al. ......................... 395/131 |
| 4,875,032 | * | 10/1989 | McManus et al. ..................... 340/703 |
| 5,136,390 | * | 8/1992 | Inova et al. ........................... 348/383 |
| 5,321,505 | * | 6/1994 | Leddy ................................... 348/383 |
| 5,369,432 | * | 11/1994 | Kennedy ............................... 348/181 |
| 5,396,257 | * | 3/1995 | Someya et al. ......................... 345/1 |
| 5,440,352 | * | 8/1995 | Deter et al. ............................ 348/750 |
| 5,452,019 | * | 9/1995 | Fukuda et al. ......................... 348/655 |
| 5,523,769 | * | 6/1996 | Lauer et al. ............................ 345/1 |
| 5,625,378 | * | 4/1997 | Wan et al. ............................. 345/150 |
| 5,633,655 | * | 5/1997 | Hara ...................................... 345/132 |
| 5,668,569 | * | 9/1997 | Greene et al. ......................... 345/103 |
| 5,721,572 | * | 2/1998 | Wan et al. ............................. 345/431 |
| 5,805,117 | * | 9/1998 | Mazurek et al. ........................ 345/1 |
| 5,828,410 | * | 10/1998 | Drapeau ................................ 348/383 |
| 5,838,396 | * | 11/1998 | Shiota et al. ........................... 348/745 |
| 5,949,967 | * | 9/1999 | Spaulding et al. ..................... 345/431 |
| 6,020,868 | * | 2/2000 | Greene et al. ........................... 345/88 |

* cited by examiner

*Primary Examiner*—Richard Hjerpe
*Assistant Examiner*—Henry N. Tran
(74) *Attorney, Agent, or Firm*—Salzman & Levy

(57) ABSTRACT

The present invention features methods and apparatus for the correction of spatial non-uniformities in color only, and color and brightness combined, that arise from materials, manufacturing, and operational variations in tiled, color flat-panel displays. Such uniformities can introduce gradual or abrupt color and brightness variations in monolithic and tiled displays. Correction methods are based on control of the manufacturing and assembly process, and/or remapping of the colors of the display to match uniformity requirements of the average human observer. Correction methods can be implemented using serial and parallel versions using electronic circuits commonly used in video signal processing. Apparatus for a self-calibration method are also described.

20 Claims, 8 Drawing Sheets

COLOR CORRECTION METHODS FOR ELECTRONIC DISPLAYS

FIELD OF THE INVENTION

This invention pertains to the field of electronic, color displays, and, more particularly, details methods and apparatus that are designed for correcting spatial nonuniformities in color and/or color and luminance on flat-panel displays that are constructed from a single display unit or a multiplicity of display tiles.

BACKGROUND OF THE INVENTION

Images on electronic displays are derived from a two-dimensional array of pixels, each of which represents one small element of the image. The resulting image is presented to the observer in a 1:1 size in direct-view displays, while projection displays magnify the image size, using an optical lens system. In black-and-white displays, each pixel displays one of two colors, black or white; in a gray-tone display, pixels can produce a specified number of gray tones between black and white. Since colors can be formed by combining primary colors red (R), blue (B) and green (G) light, in specified ratios, electronic color displays use primary-color elements in each pixel, in order to form a desired image via additive color mixing. In order to show still images, pixels can carry the same information all of the time; for moving images, the content of each pixel must be redefined periodically. Depending on the application, full-motion images are usually required to be redrawn 30 to 75 times per second.

Pixels can be accessed by using several techniques, including scan-, grid-, shift-, matrix- and direct-addressing. If, for example, the display carries an array of N×M pixels, and it has to be redrawn n times each second, the data sent to each pixel must be provided in $1/(n*N*M)$ seconds and then held constant for $(N*M-1)/(n*N*M)$ seconds, as other pixels are being defined. In the current American television (TV) standard (NTSC), each frame has about 250,000 pixels, with an aspect ratio of 4×3, which are refreshed at the rate of 30 frames/second. One of the new picture formats proposed to the Federal Communications Commission (FCC) for American high-definition television (HDTV) has an aspect ratio of 16×9 and a refresh rate of 60 frames/second. Pixels are arranged into 1280 horizontal and 720 vertical lines or, alternatively, 1920 horizontal and 1080 vertical lines (I. Gorog, "Displays for HDTV: Direct View CRTs and Projection Systems", *Proceedings of the IEEE*, vol. 82, no. 4, pp. 520–536, 1994). The typical, low-resolution computer display (VGA) has 480 rows of 640 pixels, or, a total of 307,200 pixels at a refresh rate of 72 frames/second.

Electronic displays can be implemented by using a multitude of different technologies, including, for example, the cathode-ray tube (CRT), electroluminescent displays (ELDs), light-emitting diode displays (LEDs) and liquid-crystal displays (LCDs). While a CRT display has a depth comparable to the height of the screen, ELDs and LCDs belong to that class of flat-panel displays (FPDs), the dimension of which, in their direction perpendicular to the image plane, is much smaller than that of the CRT. With the CRT, either one (gray-tone) or three (color) electron beams scan along horizontal lines in order to access each pixel. All color signals are thus carried to the pixels via the electron beam flux. FPDs (such as the LCDs) use matrix-addressing, in which each pixel is accessed via row and column lines. The column lines usually carry the color signals, while row lines are used for control signals. The pixel at the cross-point of a specific row and column line can be selected via passive or active techniques. In the passive case, the non-linearity of the pixel's element is used for the selection. For example, in LCDs the non-linearity of the liquid-crystal material is used. Active, matrix-addressed LCDs (AMLCDs), on the other hand, require a device (e.g., a transistor) for the selection of the pixel. In active matrix-addressing, a row of pixels is usually selected at once by placing a specific, control signal on the row line (usually a voltage on a transistor's gate electrode). Pixel color data is then made available via column lines to each of the pixel elements in the selected row (usually a voltage on a transistor's drain). An entire row of pixels can be accessed in parallel in active matrix-addressing. Coupling between pixels and row and column lines is one of the disadvantages of matrix-addressing.

The size of an electronic display is usually specified by the length of the diagonal of the pixel array. Computer displays generally have sizes of between 10" and 21"; home television displays generally have sizes of between 19" and 31". Large public displays (e.g., used in sports arenas) generally feature sizes that range between 200" and 700".

The resolution of the image on an electronic display is determined by the pitch of the pixels, i.e., the smaller the pixel pitch, the finer the details that can be displayed. Typical computer displays have pixel pitches on the order of 0.25 to 0.3 mm, and they can be viewed from distances as close as 30 cm without the human eye having to resolve the mosaic structure of the pixels. Large-screen, public displays have pixel pitches as large as 30 mm [see, e.g., Panasonic Astrovision, AZ-3000 Series High Density Fluorescent Displays, Panasonic Corporation, Japan, 1995]. Viewing distances of at least 10 meters are required for such displays.

A duty cycle is defined as the time spent for turning on individual pixels or a row of pixels. With a CRT, each pixel is accessed individually and sequentially by sweeping the electron beam. Thus, for example, in a VGA display with N×M=640×480 and n=72 Hz, the dwell time of the electron beam on each pixel is 46 ns. By definition this equals the duty cycle of this CRT. In an FPD VGA display with the same frame rate, the dwell time is 640 times longer or 29 $\mu$s, due to parallel matrix-addressing.

The brightness of an image on an electronic display is characterized by using the photometric quantity of luminance measured in candelas per unit area (cd/m2=1 nit). The luminous efficiency is used to describe how much light the display produces per the amount of electrical energy provided to the display. LCDs operate with highly efficient backlights (such as fluorescent lamps) with a luminous efficiency as high as 55 lm/W and a typical light transmittance of about 4%. This gives a typical luminous efficiency of 2.2 lm/W for AMLCDS, which exceeds the performance of all other display technologies. The brightness of LCDs can be increased by simply turning up the intensity of the backlight.

The contrast in a display is another important attribute. It describes the achievable light intensity modulation in the image between the brightest and dimmest pixels. An image having a greater contrast is more sparkling in appearance. The best AMLCDs achieve contrast ratios as large as 100:1. Ambient illumination affects the contrast of the displayed image. The component of the ambient illumination that is reflected from the display's surfaces will be added to the emitted intensity of the image to be displayed. The higher the contrast, the more tolerant the display is to ambient light. Of all displays, AMLCDs have the highest tolerance to ambient light, because of the presence of polarizers, and the ability of AMLCDs to independently adjust the intensity of the backlight.

The viewing characteristics of electronic displays are specified by the viewing distance and viewing angle ranges. The minimum viewing distance is related to the pixel pitch via the resolution ability of the observer's retina. Displayed images are usually best viewed at normal incidence. Maximum horizontal and vertical viewing angles away from the normal are determined by the type of the display, and the layout and the optical design of the pixels. Viewing angle ranges of ±30° horizontal and ±15° vertical are average for typical AMLCD displays.

Full-color displays are expected to be able to display 256 (8-bit) shades of each of the highly saturated primary colors red, blue and green. This results in a total of $256^3$ or 16,777,216 colors that (in principle) can be displayed. Full-color capability has been available on CRTs for quite some time via the selection of the R, B and G phosphor materials, as well as the control of the electron beam. Full color was demonstrated for the first time with LCDs in 1993 by developing 8-bit data driver circuits [G. H. Henck Van Leeuwen et al., "A Digital Column Driver IC for AMLCDs", Euro-Display, pp. 453–456, 1993; see also H. Okada, K. Tanaka, S. Tamai and S. Tanaka, "An 8-Bit Digital Data Driver for AMLCDs", Society for Information Display International Symposium Digest of Technical Papers, vol. XXV, pp. 347–350, 1994]. To date, several manufacturers have demonstrated full-color AMLCDs by using amorphous silicon (a-Si), thin-film transistors (TFT) as the switches. Saturated primary colors are defined by using a uniform "white" backlight in combination with three color filters. Driver electronics is used to provide an optimal linearization of the liquid-crystal response, in order to facilitate the additive mixing of colors.

Direct-view electronic displays with diagonals up to about 31" are usually manufactured in monolithic form, with the entire pixel array fabricated on a single continuous medium. The size of a commercial color CRT is limited by the deflection optics and the weight of the unit to about 35". Commercial, monolithic AMLCDs are currently limited to sizes less than 12" because of manufacturing yield and cost. Commercial, 16" AMLCD displays are in product development. AMLCD sizes of up to 21" have been demonstrated in research [M. Hijikigawa and H. Take, "Future Prospects of Large-Area Direct View LCDs", Society for Information Display International Symposium Digest of Technical Papers, vol. XXVI, pp. 147–149, 1995]. Very large electronic displays cannot be made in a monolithic fashion. Rather, each pixel is separately fabricated, and then the display array is assembled by accurately arranging pixels into rows and columns. The alignment process is difficult and cannot be made with high precision over large areas. As a consequence, the pixel pitch in large-screen displays usually is on the order of at least 30 mm.

Intermediate-sized electronic displays with pixel pitches from about 0.6 to 3 mm, can, in principle, be assembled from smaller monolithic pieces, with each carrying many pixels [see, e.g., N. Mazurek, T. Zammit, R. Blose and J. Bernkopf, "A 51-in Diagonal Tiled LCD VGA Monitor", Society for Information Display International Symposium Digest of Technical Papers, vol. 24, pp. 614–617, 1993]. These monolithic pieces are then arranged into a regular, tiled array to form the full display. In tiled displays, the pixel pitch on all tiles is, preferably, the same. Because of the small size of the tiles, this can be achieved with a tightly-controlled manufacturing process. The seams between adjacent tiles must be large enough to facilitate assembly. The seams will be visible to the human observer, unless the pixel spacing across the seam is the same as the pixel spacing on the tiles. This is very difficult to achieve. Consequently, to date, commercial-prototype, tiled displays have had visible seams between the tiles. The minimum achievable pixel pitch in tiled displays is, therefore, determined by the available assembly technology.

SUMMARY OF THE INVENTION

This invention describes methods and apparatus for the correction of spatial non-uniformities in chromaticity that arise from materials, manufacturing, and operational parameter variations (e.g. backlight) in tiled, color, flat-panel displays (FPDs). Such uniformities can introduce gradual or abrupt variations of color and brightness. Displays composed of a multitude of display tiles, each carrying a single pixel or an array of pixels, tend to exhibit abrupt non-uniformities at the edges of the tiles, while displays with monolithic construction tend to exhibit gradual non-uniformities. Combinations of abrupt and gradual non-uniformities may also exist. The objective of the color correction methods is to remove all variations irrespective of their origin to a level below the detection threshold of the average human observer.

The methods for correcting color variations cover the following cases: control of materials and manufacturing parameters to a predefined precision; remapping of color coordinates for non-uniform primary colors using electronic means; remapping of color coordinates for non-uniformly defined color coordinates using electronic means; remapping of color coordinates for simultaneously varying color coordinates and primary colors using electronic means; and remapping of colors for simultaneously varying color and brightness using electronic means. These color correction methods can be implemented using the electronic circuits commonly used in video processing electronics and electronic color displays. The circuit implementations can generally be performed in a serial fashion by operating on the video signal stream or by operating in the parallel mode on the data for a row of pixels at a time.

The application of these color correction methods allows the design and manufacture of monolithic and tiled electronic, color, flat-panel displays of superior uniformity or, alternatively, significant increases in the manufacturing yield to meet uniformity specifications.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Generally speaking, this invention features methods and an apparatus for correcting color variations across the pixels of electronic displays, whether these variations arise from the primary colors themselves, their additives mixed to produce other colors from the primary colors, or other components of a display (such as backlight sources).

Color Classification, Definition and Uniformity

Every color has three basic characteristics: hue, lightness and chroma. Hue is the property that distinguishes and gives each color its name. Lightness measures the amount of light reflected from the hue. Chroma measures the amount of saturation or concentration thereof. There are two common ways to classify colors by using these characteristics. The Munsell system was devised by the American portrait painter Albert Munsell in the early 1900s (D. Nickerson, "History of the Munsell System, Company and Foundation, 1-111", *Color Research Applications*, vol. 1, pp. 7–10, 69–77, 121–130, 1976). The Munsell system classifies each color (hue) according to value (which is related to lightness) and chroma. Munsell's classification is subjective due to the differences between individuals in perception of colors. The CIE system of colors was developed by the International Commission on Illumination, or, CIE (see, e.g., G. Wyszecki and W. S. Stiles, *Color Science*, 2nd edition, Wiley, New York, 1982). The CIE system is based on the use of spectrophotometers and the concept of a standard observer, expressed in color tables, and, thus, independent of a specific observer.

Display colors are usually formed by additively combining three, primary, saturated colors, for example, red (R), green (G) and blue (B). A specified number (for example: $2^8=256$ shades) of each primary color is generated by the respective color element in each pixel of the display. In this case each pixel must carry the R, G and B colors in three color elements. For example, in a CRT, when hit by the electron beam, the selected element of a color pixel emits light with its intensity approximately proportional to the electron beam flux. The same happens in the other primary color elements of the same pixel. The actual sensation of color occurs when light, emitted from each of the primary color elements within a pixel, blends in the eye and the visual cortex of the viewer. Because of this, human factors are significant in the perception of displayed colors. A specific, illustrative model for the definition of colors is hereinafter discussed. The invention is not limited to this illustrative color combination model, but, rather, applies to all possible ways of combining additively primary colors.

Figure 1:
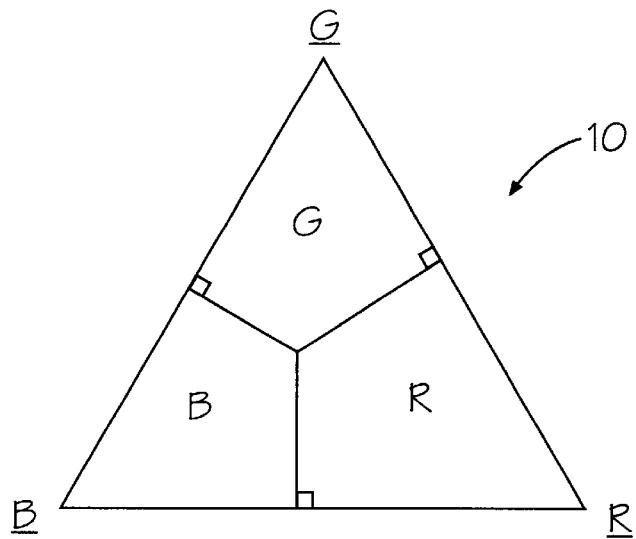
FIG. 1 illustrates a schematic view of trilinear R, G and B color coordinates.

Referring now to FIG. 1, assume that the red ($\underline{R}$), green ($\underline{G}$) and blue ($\underline{B}$) primary colors have been defined. This definition includes the tabulation of the intensity-wavelength dependence for each of the primaries, or, alternatively, specifying the CIE tristimulus values for each primary. According to standard color theory, any other color $\underline{C}$ within the color triangle 10 formed by the primaries $\underline{R}$, $\underline{G}$ and $\underline{B}$ can be expressed as a linear combination of the primaries $$\underline{C}=R\underline{R}+G\underline{G}+B\underline{B}, \quad (1)$$

where the coefficients R, G and B are the color coordinates. Linear color coordinates are used throughout this disclosure without regard to the gamma corrections and other compression techniques used to preprocess color signals in some displays. Such compressions can always be undone to recover linear color coordinates. The color defined in Equation (1) can also be specified by using the R,G,B-based chromaticity coordinates (r,g) defined by $$r=R/(R+G+B)$$
$$g=G/(R+G+B). \quad (2)$$

In this model, each color $\underline{C}$ is uniquely defined by specifying the three color coordinate (R,G,B) values for each pixel. These color coordinates are mapped on suitable drive signals (for example, voltages, currents or pulse trains) in all electronic displays. The primaries $\underline{R}$, $\underline{G}$ and $\underline{B}$ are usually chosen so that the white point of the display is given by (R,G,B)=(1,1,1). The complete set of colors formed in this fashion, via Equation (1), are called the gamut of colors for the chosen primaries. By specifying these three color coordinate values for each pixel in the N×M array of the display, the entire image has been defined. The color coordinate values correspond to electronic drive signals that control each color element. These signals include voltage, current, frequency-multiplexed and time-multiplexed, coded forms. For example, the drive signals in an AMLCD are voltages applied to the liquid-crystal cells, in order to modulate their optical rotation and thus change the optical transmission.

Although the RGB, primary-based color representation given in Equation (1) is most often used in the discussion of electronic displays, CIE-based specifications are better suited for quantitative comparisons of colors. The transformation from a particular RGB system to the CIE XYZ tristimulus values is a matrix equation of the form $$\begin{bmatrix} X \\ Y \\ Z \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} R \\ G \\ B \end{bmatrix}. \quad (3)$$

The 3×3 transformation matrix A depends, of course, on the chosen primaries $\underline{R}$, $\underline{G}$ and $\underline{B}$. For example, for the RGB system specified in Rec. 709, with the white point D65, the transformation matrix A reads $$A = \begin{bmatrix} 0.412453 & 0.357580 & 0.18024 \\ 0.212671 & 0.715160 & 0.072169 \\ 0.019334 & 0.119193 & 0.950227 \end{bmatrix}. \quad (4)$$

Once the CIE tristimulus values (X,Y,Z) are known, the CIE chromaticity coordinates (x,y) can be computed from $$x = \frac{X}{X+Y+Z} \quad (5)$$

$$y = \frac{Y}{X+Y+Z}.$$

In this representation the tristimulus value Y alone stands for the luminance. Therefore, there is always a simple correspondence between a color defined with the color coordinates (R, G, B) and the CIE chromaticity/luminance representation (x,y,Y).

The uniformity of chromaticity and luminance describes the ability of the display to define uniformly all colors and brightness across the entire pixel array of the display for any predefined combination of the primaries. This requires very good control over both the primaries and the color coordinate values. There are many potential sources of nonuniformities. Electron beam deflection and spot size are the primary sources of nonuniformities in CRTs, while materials, manufacturing- and backlight-related issues are the most common factors responsible for nonuniformities in AMLCD displays. Another mechanism giving rise to nonuniformity originates in the additive color formation process, given the display's viewing conditions. For example, an ambient light gradient may introduce a nonuniformity into the additive color sum, when the reflected light interferes with the emitted light. This phenomenon limits the use of electronic displays in bright ambient light.

Perception tests with human observers have shown that tristimulus value differences as small as 2 to 4% are observable under the most demanding viewing conditions. Perception tests also show that gradual color nonuniformities occurring continuously over many pixels are less perceptible, because the observer loses the reference over the area of the display screen. In fact, gradual color coordinate value changes as large as 10 to 20% over the size of the display screen may not be disturbing to an average viewer. Under normal viewing conditions, both brightness and color uniformities are more observable when viewed from a greater distance, rather than from up close.

Color and brightness nonuniformities in monolithic electronic displays are caused by process variations, which tend to cluster into gradual changes over large sections of the display. Therefore, monolithic displays can be manufactured with relatively large process tolerances. On the other hand, abrupt changes in brightness or color between adjacent color pixels, or groups of pixels, are disturbing. Such abrupt non-uniformities arise in displays where each pixel, or array of pixels, has been manufactured separately and then assembled to form a complete, tiled, pixel array. Materials, manufacturing- and design-related factors introduce abrupt nonuniformities in tiled displays. Another possible source of nonuniformities in tiled displays arises from the possibility that pixels close to the edge of a tile have different characteristics than do the interior pixels. If uncorrected, this effect may either cause scalloped luminance or chromaticity gradients close to the edge of tiles.

Figure 2:
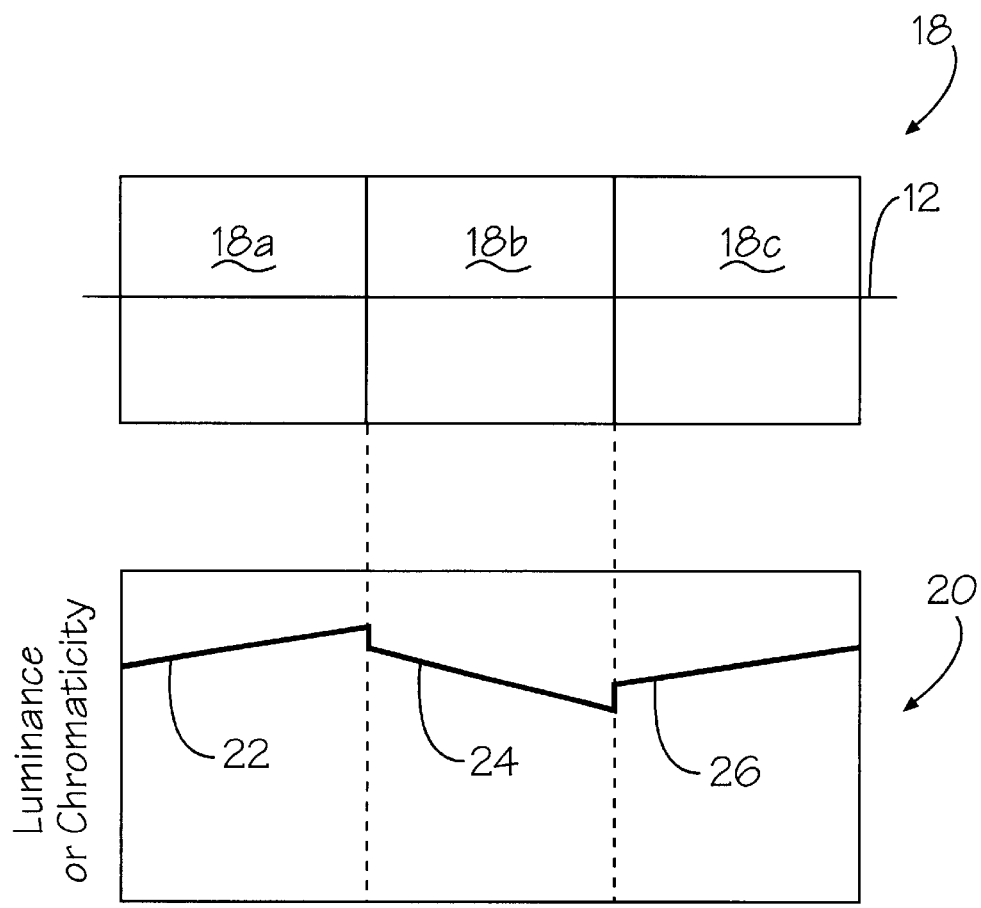
FIG. 2 portrays the luminance or chromaticity of a tiled, electronic, color display as a function of position along a line crossing over several display tiles, with the upper panel depicting the line across the tiles and the lower panel showing the luminance or chromaticity value along the line, and with both abrupt and gradual variations of these parameters respectively shown at the edges of the tiles and on the tiles.

Referring now to FIG. 2, the combination of both gradual and abrupt nonuniformities on a tiled display is illustrated. The upper portion of FIG. 2 depicts a portion of a row of a tiled, color FPD, consisting of three adjacent tiles, shown generally at reference numeral 18. Luminance and the two chromaticity values are measured at a number of positions along the line 12, placed at an arbitrary position on each of the adjacent tiles 18a, 18b and 18c. The lower portion 20 of FIG. 2 is a graphical representation of luminance or one of the two chromaticity values measured along line 12. Segments 22, 24 and 26 correspond to luminance or other values of tiles 18a, 18b and 18c, respectively. In this example, abrupt transitions in luminance or the tristimulus value occur at the boundaries between the tiles. Gradual variations occur within the tiles, as indicated by the respective, sloped-line portions.

This invention covers methods and an apparatus that correct for color nonuniformities (or combinations of color- and brightness nonuniformities) in electronic displays. While the methods work both for gradual and abrupt nonuniformities, they are most useful for the latter, especially for displays that are assembled from single pixels or are tiled from rectangular arrays of pixels.

Description of Color Correction Methods

In order to accurately match colors on electronic displays, the perceived brightness and color have to match within the human eye's discrimination threshold. "Brightness" describes the appearance of the radiant flux of an object. The brightness of an object depends on the viewing conditions of the display and the adaptation of the observing eye. The psychophysical equivalent to brightness is luminance, which is, of course, independent of viewing and observation conditions. Luminance is quantified by using the concept of luminous flux per projected area of the source of light. The ability of the human eye to discriminate between two luminances is measured using Weber's fraction. Assume that two objects are viewed side by side, with one object having the luminance of B, and the other B+ΔB. Assume further that ΔB is increased from 0 to a value that makes the brightness of the two objects detectably different. The discrimination threshold value, then, for ΔB defines Weber's ratio as ΔB/B. According to extensive visual discrimination studies, Weber's fraction is not a constant (i.e., Weber's original law), but, rather, depends on the luminance B [S. Hecht, "The Visual Discrimination of Intensity and the Weber-Fechner Law", *Journal of General Physiology*, vol. 7, p. 214, 1924]. However, for the luminance range from 1 to 1000 cd/m² (nit) desirable for electronic displays, ΔB/B is approximately constant, and has the value on the order of 0.04 for a dark surround. Weber's fraction increases rapidly for reducing brightness levels, when the eye of the observer goes from photopic to scotopic vision. For example, at $1 \times 10^{-6}$ nit ΔB/B is 0.14.

In terms of physical quantities, luminance is defined as:

$$B = K_m \int \frac{V(\lambda)P(\lambda)}{\omega\alpha\cos\theta} d\lambda, \quad (6)$$

where: $K_m$, $V(\lambda)$, $P(\lambda)$, ω and α cos θ denote the maximum luminous efficiency (683 lm/W), the relative efficiency or luminosity function, radiant flux, solid angle and projected source area, respectively [see, e.g., *Television Engineering Handbook Featuring HDTV Systems*, McGraw-Hill, edited by K. B. Benson, revised by J. C. Whittaker, 1992]. The international standard for luminance is determined by blackbody radiation at 2042 K and is set at 60 nit. Quantities related to luminance that are often used include luminous flux, defined as $$F=K_m \int V(\lambda)P(\lambda)d\lambda$$

and measured in lumens (lm), and luminous intensity, defined as $I=F/\omega$ and measured in lm/steradian.

As can be seen from Equation (6), luminance is an additive quantity. Therefore, the luminance of a color field additively mixed from three components can be written as $$L=R\,L_R+G\,L_G+B\,L_B, \quad (7)$$

where $L_R$, $L_G$ and $L_B$ denote the luminance unit amounts of the primaries R, G and B. Linear, primary excitations are assumed. As an example, for the commonly used CRT phosphors (Rec. 709), the relative primary luminances are $L_R=0.2125$, $L_G=0.7154$ and $L_B=0.0721$. The unit luminances are usually adjusted so that, when they are combined in equal amounts, they will produce the display white, e.g., the CIE illuminant D65 [International Commission of Illumination]. Therefore, in order to make an electronic color display uniform in terms of luminance, the resultant luminance must be controlled within the luminance band given by Weber's fraction $\Delta L/L$. Resultant luminance variations in violation of this condition may arise from color coordinate or color element unit luminance variations.

Several different methods for keeping the resultant luminance constant have been described in the co-pending patent application, Ser. No. 08/636,604, filed on Apr. 23, 1996, now abandoned in favor of Ser. No. 09/173,068, filed Oct. 14, 1998, and herein incorporated by reference.

Colors in electronic displays are usually defined by specifying a "gray" level for each primary color, and then combining the three primaries additively as expressed by Equation (1). If, for example, each color has $2^8=256$ gray levels, there will a total of $256^3=16,777,216$ different color coordinate combinations. This is the 3×8=24-bit scheme, which is usually considered to provide "full color". A smaller number of gray levels per primary (7, 6, 5, 4, 3) and 2 bits will give a total of 2,097,152; 262,144; 32,768; 4,096; 512; and 64 different color coordinate combinations, respectively.

The number of colors that can be distinguished under certain viewing conditions depends upon the tristimulus values of the primaries and the threshold for color difference perception. Many different studies of equally perceptible color differences have been made over the entire range of visible colors. Perhaps the best-known study has been done by MacAdam [D. L. MacAdam, "Visual Sensitivities to Color Differences in Daylight", *Journal of Optical Society of America*, vol. 32, pp. 247–274 (1942)]. According to these studies, the threshold for color difference perception depends upon the color. The human eye is most and least sensitive to variations among the blue and green colors, respectively. The threshold sensitivity to red colors is in the middle range.

In order to maintain faithful chromaticity reproduction across an electronic display, both primary colors and the color coordinates must be maintained from pixel to pixel. As with luminance, an observer can best spot chromaticity nonuniformities at sharp boundaries between uniform color patches. Gradual color variations across a significant distance on the screen are much less perceptible. Chromaticity variations can be characterized with Weber's fractions $\Delta R/R_o$, $\Delta G/G_o$, and $\Delta B/B_o$, where $R_o$, $G_o$ and $B_o$ denote the center color coordinates and $\Delta R$, $\Delta G$ and $\Delta B$, the variations. Local, (i.e., pixel-to-pixel) color control on the order of 1 to 5% must be achieved, while gradual global variations as large as 10–20% are tolerable under many viewing conditions.

According to Equation (1), chromaticity nonuniformities arise either from the primary colors or the color coordinates. In CRTs, primary colors are produced by fluorescent phosphors (relatively well-controlled materials characteristic of monolithic screens), while color coordinates are defined by the electron flux hitting each color stripe through the shadow mask at each pixel. In a monolithic AMLCD, primaries are formed by light transmitted through a patterned color filter layer with R, G and B stripes. Color coordinates are determined by the backlight and the LCD cell for each color element (including the liquid-crystal layer, the thin-film transistor and the polarizers). As with luminance, chromaticity nonuniformities arising from materials, manufacturing, structural or operational parameters in monolithic electronic displays tend to be gradual over the display area. In tiled displays, abrupt changes will arise at the tile boundaries.

Figure 3:
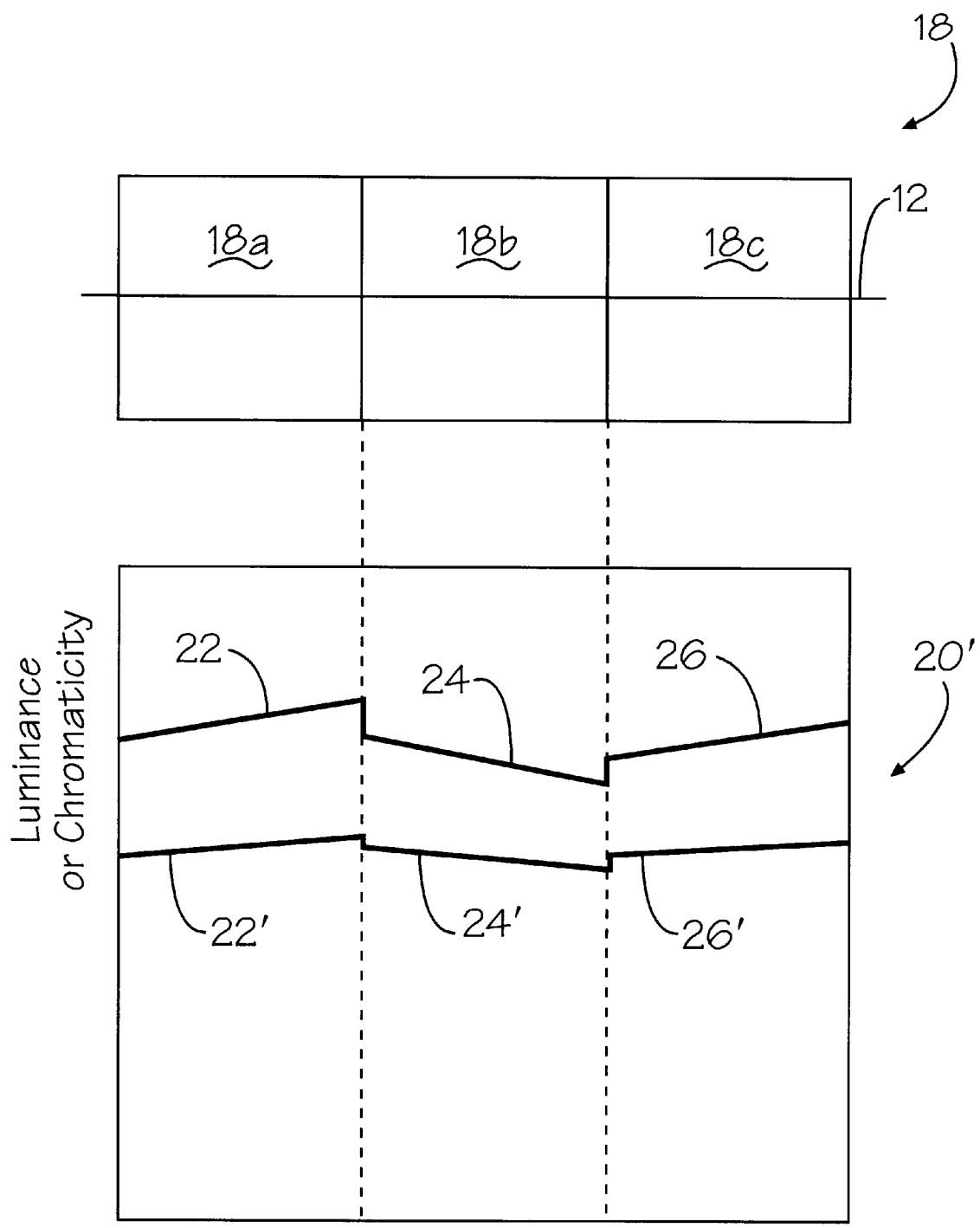
FIG. 3 depicts the luminance or chromaticity of a tiled, electronic, color display as a function of position before and after correction.

This invention includes several different methods for keeping the resultant chromaticity either alone or together with the luminance of selected display pixels that are substantially constant, using active control means. Strictly speaking, the chromaticity threshold applies only to adjacent pixels, or to two adjacent groups of pixels having a sharp boundary. For more distant pixels, or groups of pixels, gradual luminance variations as large as 10 to 20% may be permissible. This range of variations is known as the gradient rule. For gradual variations, the gradient of the chromaticity is the key parameter to control. Chromaticity may be held constant in many ways by adjusting the three components and their sum in Equation (1). This property will be demonstrated hereinafter to correct the chromaticity or luminance so that the remaining variations will be below the detection threshold, as shown in FIG. 3. The upper portion of this FIGURE shows a row of tiles 18 and the lower portion 20' the luminance or chromaticity as a function of position along the line 12 across the tiles 18. Segments 22, 24 and 26 show the non-uniform characteristics of the display before correction, and segments 22', 24', and 26' show the corrected characteristics that meet the criteria set for the detection threshold. It is assumed for illustrative purposes that the display described hereinbelow is of the normally dark type. In such a display, the drive signals control positive chromaticity and luminance contributions from each color element to form the desired color and brightness for each pixel. However, the methods apply equally well to normally bright displays, in which the drive signals reduce the contributions of each pixel from the display white.

The methods described in this invention assume that the pixels selected for correction are active, i.e., that their gray levels can be fully modulated to all levels between white and black. Completely inactive pixels (which can be stuck in the black, white or intermediate states) will not be considered. However, if the faulty pixels are partially active and can reach a subset of the levels between white and black, the present methods can be used to set these pixels in real time into states closest to the chromaticity and luminance of adjacent pixels, and thus make them less disturbing to the observer in the displayed image.

(i) Color Correction Method for Case With Uniform Color Coordinates and Uniform Primary Colors In this case R, G and B color coordinates and the primary colors R, G and B are kept uniform within the chromaticity and luminance tolerances. In this embodiment, this is achieved by tightly controlling materials, design, manufacturing and operational parameters individually to tolerances that do not exceed the threshold for the additive sum in the sense of Equation (1). In monolithic displays with clustered nonuniformities, the gradient rule is met, since the parameters tend to vary smoothly. For tiled displays, the tolerance threshold between pixels on adjacent tiles should not be exceeded. Sorting operations and tile clustering may be used to enhance yields, when assembling tiled displays. Nevertheless, this embodiment requires very tight control of all parameters, and may lead to an impractical situation for tiled displays.

(ii) Color Correction Method for Case with Uniform Color Coordinates and Non-Uniform Primary Colors Assume that uniform color coordinates are supplied to each pixel, but that primary colors vary from pixel to pixel. Consider, as an example, two pixels, 1 and 2, with different primaries, the first one producing the color $\underline{C}_1$, and the other, $\underline{C}_2$:

$$\underline{C}_1 = R\underline{R}_1 + G\underline{G}_1 + B\underline{B}_1 \qquad (8)$$

$$\underline{C}_2 = R\underline{R}_2 + G\underline{G}_2 + B\underline{B}_2 \qquad (9)$$

Here, $\underline{C}_1$ and $\underline{C}_2$ are approximately the same, but not quite identical, colors. Since both Equations (8) and (9) can approximately represent a full gamut of colors, each of the primaries in one system can be represented as a linear combination in the other. Hence, if the primaries of the first system are expressed in terms of the second system, one obtains:

$$\underline{R}_1 = a_{11}\underline{R}_2 + a_{12}\underline{G}_2 + a_{13}\underline{B}_2 \qquad (10)$$

$$\underline{G}_1 = a_{21}\underline{R}_2 + a_{22}\underline{G}_2 + a_{23}\underline{B}_2 \qquad (11)$$

$$\underline{B}_1 = a_{31}\underline{R}_2 + a_{32}\underline{G}_2 + a_{33}\underline{B}_2. \qquad (12)$$

Then, $$\underline{C}_1 = R(a_{11}\underline{R}_2 + a_{12}\underline{G}_2 + a_{13}\underline{B}_2) + G(a_{21}\underline{R}_2 + a_{22}\underline{G}_2 + a_{23}\underline{B}_2) + B(a_{31}\underline{R}_2 + a_{32}\underline{G}_2 + a_{33}\underline{B}_2), \qquad (13)$$

or $$\underline{C}_1 = (R\,a_{11} + G\,a_{21} + B\,a_{31})\underline{R}_2 + (R\,a_{12} + G\,a_{22} + B\,a_{32})\underline{G}_2 + (R\,a_{13} + G\,a_{23} + B\,a_{33})\underline{B}_2. \qquad (14)$$

This is equivalent to the color coordinate transformation of:

$$R' = (R\,a_{11} + G\,a_{21} + B\,a_{31}) \qquad (15)$$

$$G' = (R\,a_{12} + G\,a_{22} + B\,a_{32}) \qquad (16)$$

$$B' = (R\,a_{13} + G\,a_{23} + B\,a_{33}) \qquad (17)$$

or:

$$\begin{bmatrix} R' \\ G' \\ B' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix} \qquad (18)$$

for color $\underline{C}_1$ in the second primary system $\underline{R}_2$, $\underline{G}_2$ and $\underline{B}_2$.

Figure 4:
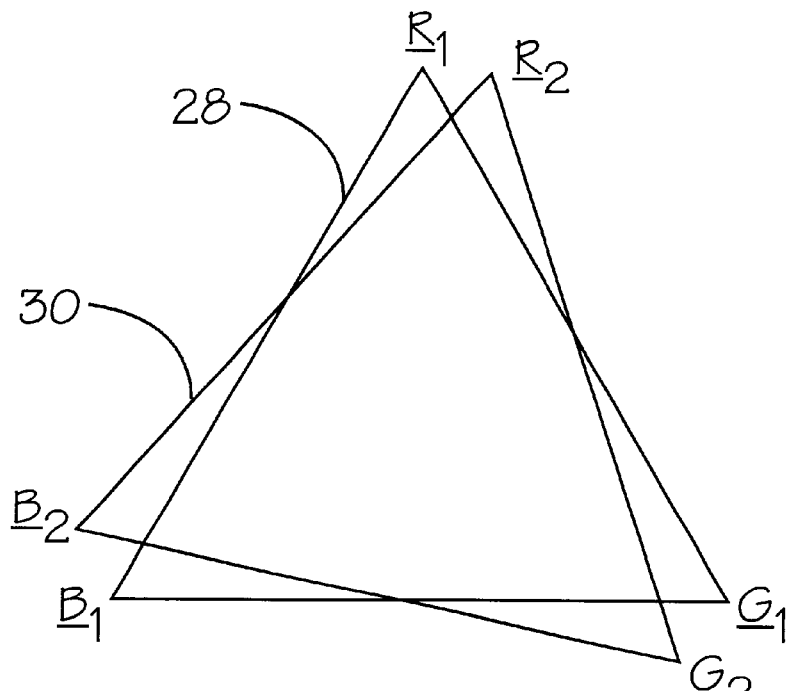
FIG. 4 shows the overlapping color gamuts of two sets of primary colors, $\underline{R}_1$, $\underline{G}_1$ and $\underline{B}_1$, and $\underline{R}_2$, $\underline{G}_2$ and $\underline{B}_2$, with the union of the two gamuts represented by the overlapping region of the two triangles.
Figure 5:
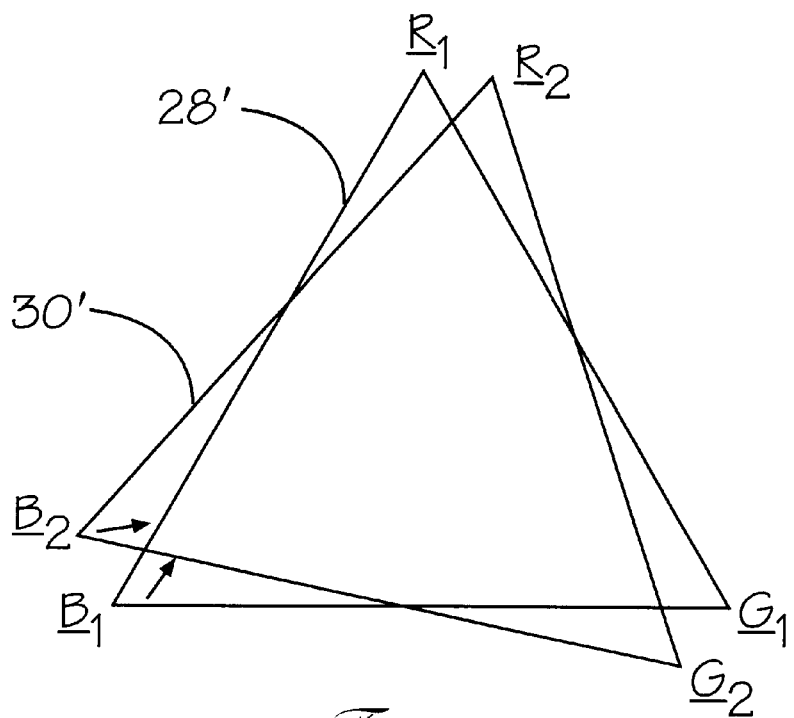
FIG. 5 depicts the compression of colors into the union of two partially overlapping gamuts, with two colors being moved into the union of the gamuts.

Therefore, if the transformation matrix a in Equation (18) can be stored, and the multiplications and summations performed in real time, then the colors $\underline{C}_1$ and $\underline{C}_2$ can be accurately matched for all colors in the union of the two color gamuts 28 and 30 (see FIG. 4). Colors outside the union cannot be expressed in one system or the other. However, since only relatively small, color nonuniformities are addressed in this disclosure, any color lying outside the union of the gamuts 28' and 30' (FIG. 5) can be replaced by the closest color therein.

Since the color transformation matrix a is defined by 9 elements, nine numbers per pixel need to be stored, and 9 multiplications and 8 summations performed, in order to perform the transformation. Thus, for a display with a resolution of 1024×768, there will be 7,707,888 numbers to be stored. The precision of the color coordinates in the worst case is only 8 bits and, therefore, both storage and arithmetical operations can be performed at a precision that is only a few digits higher, making sure that the end results are to correct to 8 bits. Therefore, these operations can be performed either in the integer domain combined with linear scaling, or in the fixed-point decimal domain.

Figure 6:
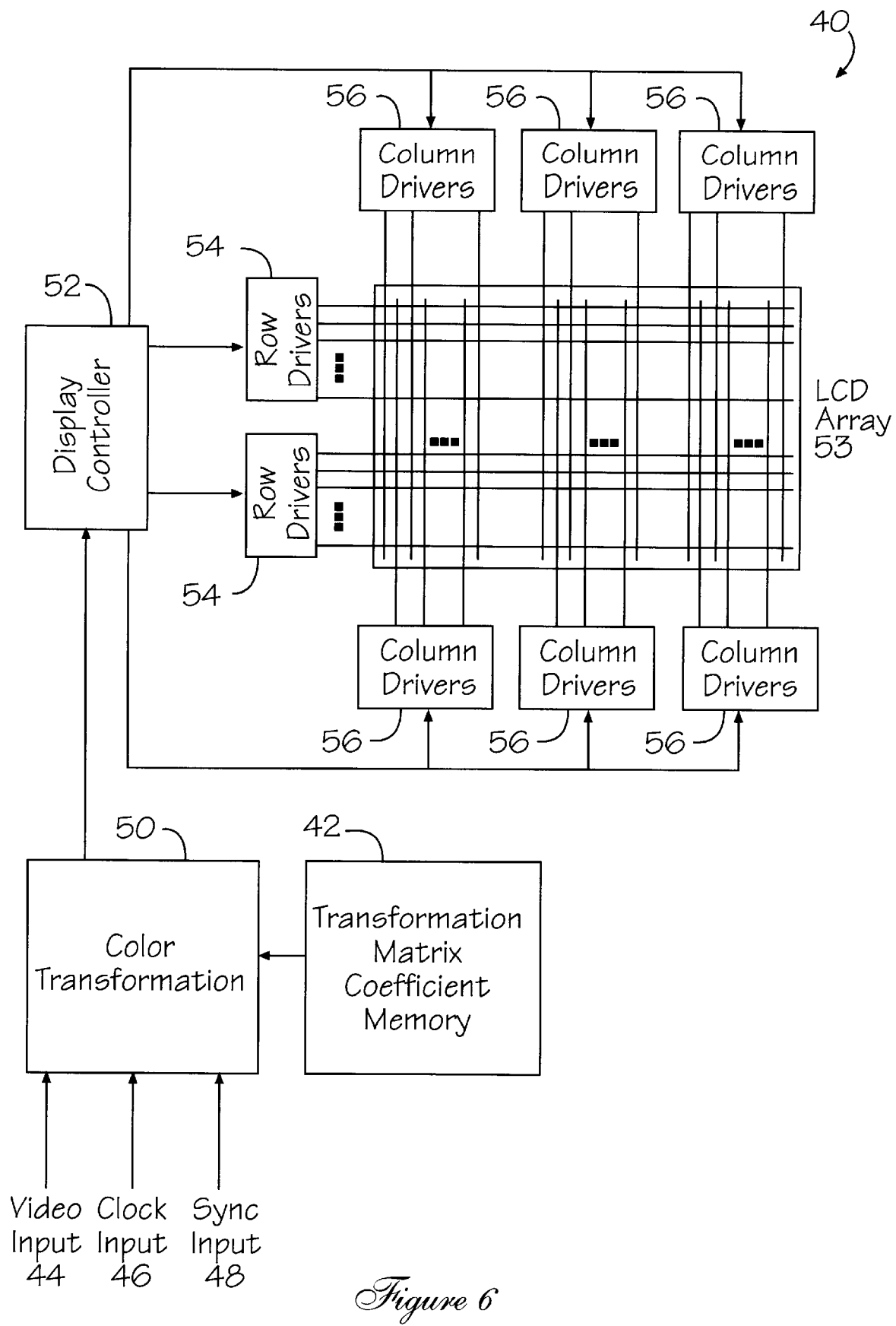
FIG. 6 illustrates one embodiment of the color correction method of the serial implementation of Equations (18) with a single color transformation unit and single sub-system for storing transformation matrix coefficients.

Referring now to FIG. 6, an embodiment 40 of the color correction method expressed in Equation (18) is shown. A single color transformation unit 50 receives video input 44, clock input 46, and synchronization input 48 from a video source, usually a video card, not shown. The coefficients of the transformation matrix of the selected pixels are stored in a memory sub-system 42. The color transformation unit 50 operates on the pixel data, one pixel at a time, and passes the corrected color coordinates, R', G', and B', to the display controller 52, which interacts with the row drivers 54 and column drivers 56 in a conventional fashion to distribute the pixel data to the LCD array unit 53.

Figure 7:
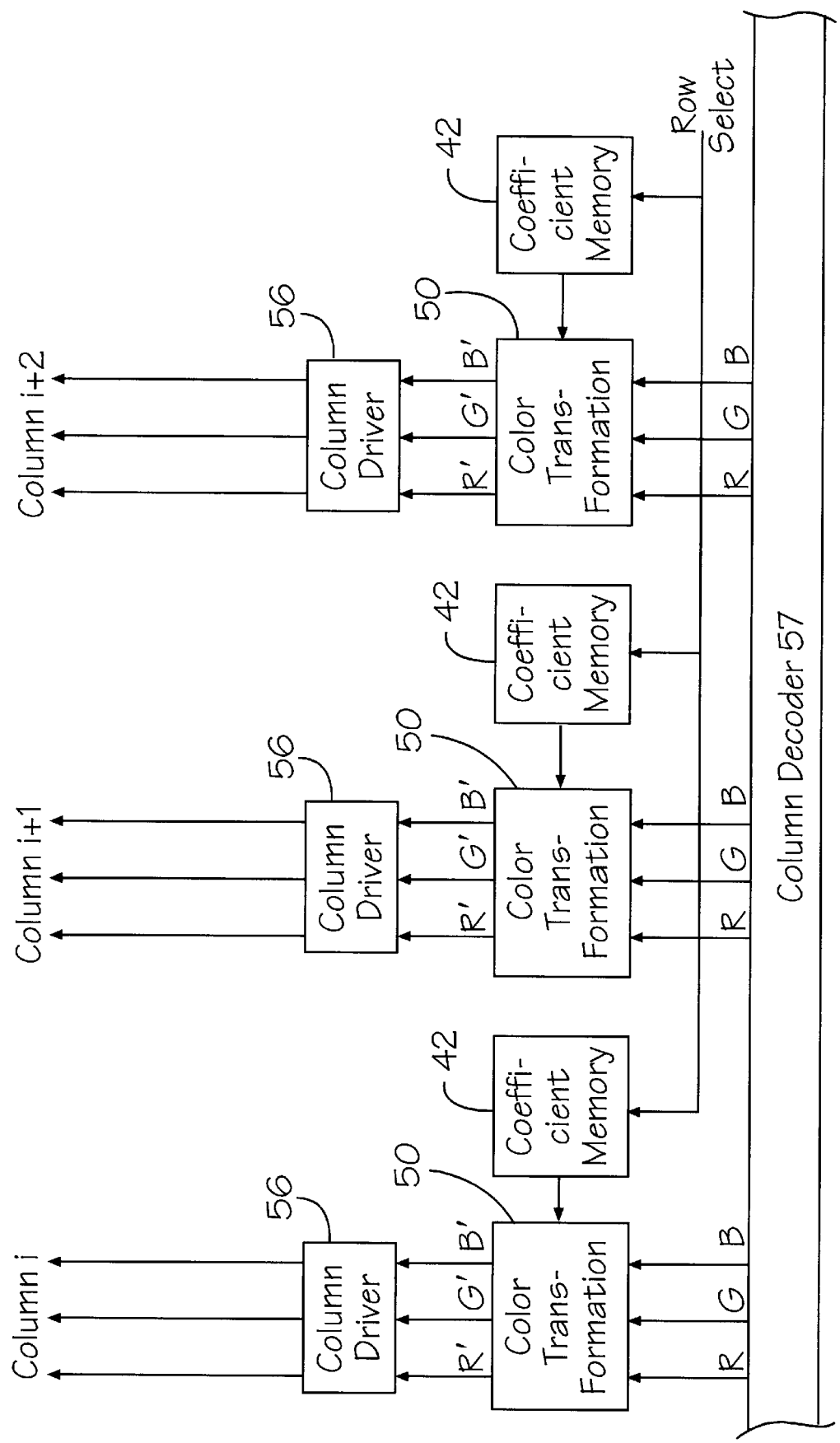
FIG. 7 depicts one embodiment of the color correction method of the parallel implementation of Equations (18) with multiple color trans-formation units and transformation matrix coefficient memory units, each located in proximity of the column driver circuits.

The computational time required for the arithmetical operations in Equation (18) can be minimized by performing color transformations in parallel for each row of pixels. A parallel embodiment of the color correction method expressed in Equation (18) is depicted in FIG. 7. Multiple color transformation units 50 and memory units 42 for storing color transformation data are used. The implementation in FIG. 7 uses one color transformation unit 50 per column driver 56 as an illustrative example only. Uncorrected pixel data (R, G, and B) is passed from the column decoder 57 to each of the color transformation units 50. They perform the color transformations in parallel for an entire row of pixels and pass the corrected data, R', G', and B', to the column driver circuits 56. These arithmetical operations can also be integrated into the column driver circuits. These operations can be pipelined, as well. For tiled displays having uniform color offsets (compared to other tiles), only one transformation matrix per tile needs to be stored. All pixels on each tile will be subjected to the same transformation. This simplifies the electronics and reduces the storage cost dramatically. If color variations follow a simple, spatial form, e.g., linear vs. position in the pixel array, the elements of the transformation matrix can be interpolated linearly. While this will further reduce storage requirements, it will simultaneously require further real-time computations.

In practical embodiments, the color transformations defined in Equation (18) must be performed with respect to a suitably chosen reference system ($\underline{R}_{ref}$, $\underline{G}_{ref}$ and $\underline{B}_{ref}$), which should be chosen so that it is contained within the union of the color gamuts formed by all of the pixels that have been selected for matching from over the entire area of the display. The reference system should also be color-balanced, so that equal-strength primaries result in the desired white point (e.g., the CIE illuminant D65). If these conditions are not met, small regions of colors cannot be represented, because of the non-overlapping nature of the gamuts (see, e.g., FIG. 5). The amount of color compression that has to be accepted, when pixel colors are transformed into the union of all gamuts, is relatively small and, under typical viewing conditions, unobservable. However, the total number of colors that can be displayed can be reduced.

The color gamuts produced by each pixel can best be characterized by determining the CIE tristimulus values (X,Y and Z) or the CIE chromaticity coordinates (x,y) and luminance value Y, via pixel-to-pixel measurements. The measurements can be performed by scanning each selected pixel, using commercially available calorimeters (e.g., Tektronix Lumacolor JXX). Either single pixels or a group of pixels can be measured by selectively turning on the primaries and the local white point. Measurements are best performed under computer control and data stored in memory. Based on this information, the color gamuts and their union can be computed, and the reference system chosen. After that, the transformation matrices can be determined by using the mathematics described in Equations (8)–(18). All of these operations can be best performed during the final testing of the display by scanning selected pixels, e.g., on an x–y table, on which both the lateral position (x,y) and the distance of the calorimeter head from the pixel plane (z) can be accurately controlled. Once the transformation matrices are known, they can be stored into the display's non-volatile memory.

(iii) Color Correction Method for Case with Uniform Primary Colors and Non-Uniform Primary Color Coordinates In this case, it is assumed that the primary $\underline{R}$, $\underline{G}$ and $\underline{B}$ colors are uniform across the screen, but that the color coordinates vary somewhat in a known way across the pixels. The color coordinates R, G and B must be adjusted so that the relative weights of the primaries become correct in the sense of Equation (1), if correct additive colors are to be reproduced. Here it is assumed that the variations of the color coordinates can expressed in function form, for example, $$R'=f_R(R)$$

$$G'=f_G(G)$$

$$B'=f_B(B), \quad (19)$$

where (R', G', B') and (R, G, B) denote the correct and actual color coordinates at an arbitrary pixel, respectively. The functions $f_R$, $f_G$ and $f_B$ are assumed to be independent of the values of R, G, and B but dependent on the pixel. The functional form can be established by performing a set of optical measurements on each color element of the selected pixels over a predetermined number of color coordinate values. Examples of simple functional forms include $$R'=R+R_o \quad (20)$$

and $$R'=R+R_o+u(R-R_{ref}) \quad (21)$$

with similar equations holding for other color coordinates. Above $R_o$, $R_{ref}$, and u denote a constant off-set, reference color coordinate value, and a linear multiplier, respectively. Given sufficiently simple forms for the functions $f_R$, $f_G$, and $f_B$, they can parameterized, the parameters stored in memory, and then evaluated in real time for pixels selected for correction. Storage requirements depend on the form and parametrization of the functions. Dramatic reduction of storage may be achieved in cases where the functions change in a simple way from pixel to pixel and interpolation techniques can be employed to compute parameters for a significant fraction of the pixels. The implementations of this method are similar to those shown in FIGS. 6 and 7 except for the fact that the color transformer unit(s) is (are) replaced with units capable of performing the mathematics described in this section including any interpolation required.

(iv) Color Correction Method for Case with Non-Uniform Color Coordinates and Non-Uniform Primary Colors Method In this case both color coordinates and primary colors are non-uniform due to parameters related to design, materials, manufacturing, or operational issues. If as before, both color coordinate and primary color variations are predictable across the pixel array, they can be corrected in much the same way as described above. Now one needs to combine the procedures in (ii) and (iii). The storage requirements are on the order of the sum of cases (ii) and (iii).

(v) Color and Brightness Correction Method for Case with Simultaneous Non-Uniform Color and Non-Uniform Brightness In the most general case both chromaticity and luminance of a display may simultaneously exhibit sufficiently large variations that must be corrected in order to meet predefined uniformity goals. Now the primaries $\underline{R}_i$, $\underline{G}_i$, and $\underline{B}_i$ at the pixels i do not necessarily even have a well defined white point. In such a case we first measure the tristimulus values of the primaries with the result given in Table 1. Both commonly used CIE representations, (X,Y,Z) and (x,y,Y), are given in this table. With all color coordinates normalized to $0 \leq R_i \leq 1$, $0 \leq G_i \leq 1$ and $0 \leq B_i \leq 1$, the true color and brightness for pixel i will be given in Table 2.

TABLE 1

Tristimulus values for primaries $\underline{R}_i$, $\underline{G}_i$, and $\underline{B}_i$ at the pixel i.

| Primary | CIE X | CIE Y | CIE Z | CIE x | CIE y | CIE Y |
|---|---|---|---|---|---|---|
| $\underline{R}_i$ | $X_{1i}$ | $Y_{1i}$ | $Z_{1i}$ | $x_{1i}$ | $y_{1i}$ | $Y_{1i}$ |
| $\underline{G}_i$ | $X_{2i}$ | $Y_{2i}$ | $Z_{2i}$ | $x_{2i}$ | $y_{2i}$ | $Y_{2i}$ |
| $\underline{B}_i$ | $X_{3i}$ | $Y_{3i}$ | $Z_{3i}$ | $x_{3i}$ | $y_{3i}$ | $Y_{3i}$ |

TABLE 2

True tristimulus values at pixel i for the primaries given in Table 1 with color coordinates ($R_i$, $G_i$, and $B_i$).

| $R_i$, $G_i$, $B_i$ | CIE X | CIE Y | CIE Z | CIE x | CIE y | CIE Y |
|---|---|---|---|---|---|---|
| $R_i$ | $R_iX_{1i}$ | $R_iY_{1i}$ | $R_iZ_{1i}$ | $R_ix_{1i}$ | $R_iy_{1i}$ | $R_iY_{1i}$ |
| $G_i$ | $G_iX_{2i}$ | $G_iY_{2i}$ | $G_iZ_{2i}$ | $G_ix_{2i}$ | $G_iy_{2i}$ | $G_iY_{2i}$ |
| $B_i$ | $B_iX_{3i}$ | $B_iY_{3i}$ | $B_iZ_{3i}$ | $B_ix_{3i}$ | $B_iy_{3i}$ | $B_iY_{3i}$ |
| Sum | $R_iX_{1i}+$ $G_iX_{2i}+$ $B_iX_{3i}$ | $R_iY_{1i}+$ $G_iY_{2i}+$ $B_iY_{3i}$ | $R_iZ_{1i}+$ $G_iZ_{2i}+$ $B_iZ_{3i}$ | $R_ix_{1i}+$ $G_ix_{2i}+$ $B_ix_{3i}$ | $R_iy_{1i}+$ $G_iy_{2i}+$ $B_iy_{3i}$ | $R_iY_{1i}+$ $G_iY_{2i}+$ $B_iY_{3i}$ |

In terms of this result uniformity requires that $$R_i x_{1i}+G_i x_{2i}+B_i x_{3i}=\text{constant} \quad (22)$$

$$R_i y_{1i}+G_i y_{2i}+B_i y_{3i}=\text{constant} \quad (23)$$

for chromaticity and $$R_i Y_{1i}+G_i Y_{2i}+B_i Y_{3i}=\text{constant} \quad (24)$$

for luminance. Notice that Equation (24) essentially restates Equation (7).

For a perfectly uniform display the color coordinates ($R_i$, $G_i$, $B_i$), primary chromaticities ($x_{1i}$, $y_{1i}$), ($x_{2i}$, $y_{2i}$), and ($x_{3i}$, $y_{3i}$), and primary luminances $Y_{1i}$, $Y_{2i}$, and $Y_{3i}$ are independent of i. Therefore the expressions (22)–(24) are by construction constant for the same video signal. If on the other hand, primaries vary from pixel to pixel, both chromaticity and luminance tend to be nonuniform at the same time.

In the most general case Equations (22)–(24) can be satisfied by picking a reference point (j) and then matching all other points to it. This will require the solution of the linear system $$R_i x_{1i} + G_i x_{2i} + B_i x_{3i} = C_{1j} \quad (25)$$

$$R_i y_{1i} + G_i y_{2i} + B_i y_{3i} = C_{2j} \quad (26)$$

$$R_i Y_{1i} + G_i Y_{2i} + B_i Y_{3i} = C_{3j} \quad (27)$$

for the color coordinates ($R_i$, $G_i$, $B_i$). When this solution ($R_i'$, $G_i'$, $B_i'$) is used to replace the nominal color coordinates ($R_i$, $G_i$, $B_i$), the display will be fully uniform. However, a new solution will be needed for each combination color coordinates ($R_i$, $G_i$, $B_i$) and as a consequence the transformations corresponding to the solutions are difficult to store, but should be computed in real time, which leads to much more computation.

Consider next a more restrictive case, for which the chromaticity and luminance uniformities are small. Then $$x_{1i} = x_{1i0} + \Delta x_{1i} \quad (28)$$

$$y_{1i} = y_{1i0} + \Delta y_{1i} \quad (29)$$

$$Y_{1i} = Y_{1i0} + \Delta Y_{1i}. \quad (30)$$

Substituting these equations in Equations (25)–(27) and realizing that the center value contributions on both sides cancel, one obtains $$R_i \Delta x_{1i} + G_i \Delta x_{2i} + B_i \Delta x_{3i} = 0 \quad (31)$$

$$R_i \Delta y_{1i} + G_i \Delta y_{2i} + B_i \Delta y_{3i} = 0 \quad (32)$$

$$R_i \Delta Y_{1i} + G_i \Delta Y_{2i} + B_i \Delta Y_{3i} = 0. \quad (33)$$

By expressing color coordinates also in difference form, or $R_i = R_{io} + \Delta R_i$ with similar equations holding for other components, Equations (31)–(33) can be rewritten as $$\Delta R_i \Delta x_{1i} + \Delta G_i \Delta x_{2i} + \Delta B_i \Delta x_{3i} = -(R_{io} \Delta x_{1i} + G_{io} \Delta x_{2i} + B_{io} \Delta x_{3i}) \quad (34)$$

$$\Delta R_i \Delta y_{1i} + \Delta G_i \Delta y_{2i} + \Delta B_i \Delta y_{3i} = -(R_{io} \Delta y_{1i} + G_{io} \Delta y_{2i} + B_{io} \Delta y_{3i}) \quad (35)$$

$$\Delta R_i \Delta Y_{1i} + \Delta G_i \Delta Y_{2i} + \Delta B_i \Delta Y_{3i} = -(R_{io} \Delta Y_{1i} + G_{io} \Delta Y_{2i} + B_{io} \Delta Y_{3i}) \quad (36)$$

This shows that even small corrections are interdependent in a similar fashion as Equations (25)–(27) unless the determinant in Equations (31)–(33) (alternatively Equations (34)–(36)) is zero. In that case the solution for the correction is independent of the particular color being displayed. Therefore the solution for the small differences in Equations (31)–(33) or (34)–(36) leads to a very similar mathematical problem as that of Equations (25)–(27).

From the practical point of view it is advantageous to solve for the small corrections from Equations (31)–(33) or (34)–(36). The primary reason for this is that then the original color coordinates ($R_i$, $G_i$, $B_i$) at pixel i can be used, if the correction mathematics fails in isolated cases because of numerical instabilities or near linear dependencies. Note also that an accurate solution is not needed, because the corrections need to reduce chromaticity and luminance nonuniformities only below the detection threshold for the average observer. As a consequence, fast approximate techniques, including adaptive, neural network, or fuzzy logic-type solutions are possible. Also, the solutions can again be implemented one pixel row at a time, using parallel real time processing, rather than serial processing using a single centralized correction processor operating on the entire pixel stream. The required reference primaries ($\underline{R}_{ref}$, $\underline{G}_{ref}$, $\underline{B}_{ref}$) can be chosen to be one of the pixels, or alternatively it can be a virtual one specified e.g., via the CIE chromaticity and luminance of its primaries ($x_{ref}$, $y_{ref}$, $Y_{ref}$).

In order to set up the linear equations, for example as listed in Equations (25)–(27), the CIE chromaticities and luminances for each pixel and the reference system need to be stored. This requires nine numbers per pixel. Equation set-up will take 9 multiplications and 6 sums. The CIE chromaticity coordinates are confined into the range $0 < x_i$, $y_i < 1$ and the luminances typically less than 100 to 200 nits for typical FPDs. Therefore computations can be performed using fixed point arithmetic at a precision sufficient to guarantee a final result precise to 8 bits. This would be determined by the condition number of the corresponding matrix. Among the number of fast solution methods that can be applied to this problem include the LU-decomposition method. The coefficients on the left hand side of Equations (25)–(27) will always be the same for each pixel. This can be further used to speed up the computations by sharing some of the computational start-up cost involved in the solution. Once the equations have been solved, the solution ($R_i$, $G_i$, $B_i$) can directly be sent to pixel i for display.

Figure 8:
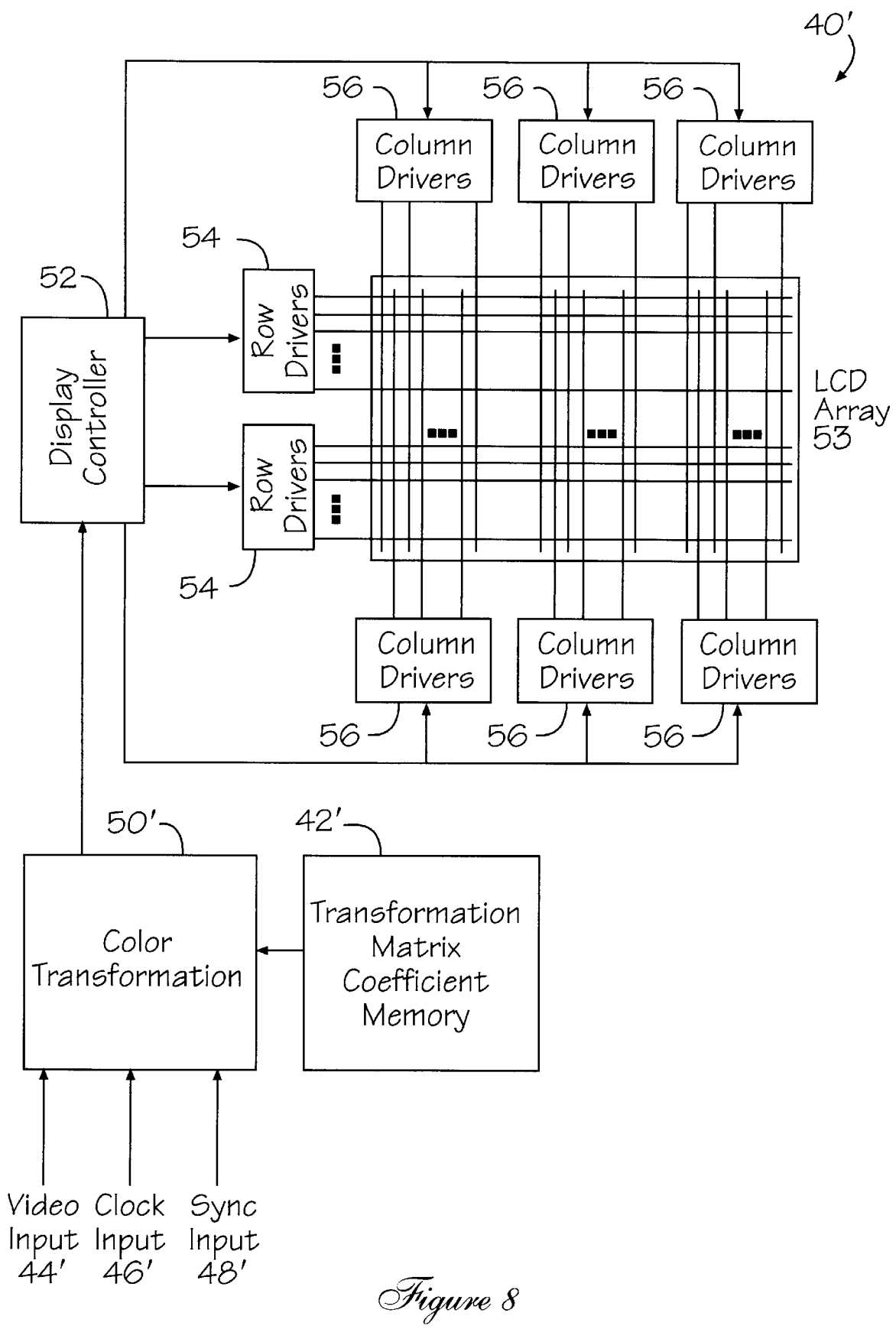
FIG. 8 shows one embodiment of the simultaneous chromaticity and luminance correction method of the serial implementation of Equations (25)–(27) with a single pixel processor unit and a single memory sub-system for storing primary chromaticity and luminance data for selected pixels.

A serial implementation of this method is shown in FIG. 8. A single pixel color processor unit 50' receives video input 44', clock input 46', and synchronization input 48' from a video source, usually a video card, not shown. The chromaticity and luminance data for the primaries of the selected pixels and the reference pixel are stored in a memory sub-system 42'. The pixel color processor unit 50' operates on the pixel data, one pixel at a time, computes the corrections in accordance with Equations (25)–(27) or the equivalent equations (31)–(33) or (34)–(36), and passes the corrected color coordinates, R', G', and B', to the display controller 52, which interacts with the row drivers 54 and column drivers 56 in a conventional fashion to distribute the pixel data to the LCD array unit 53.

Figure 9:
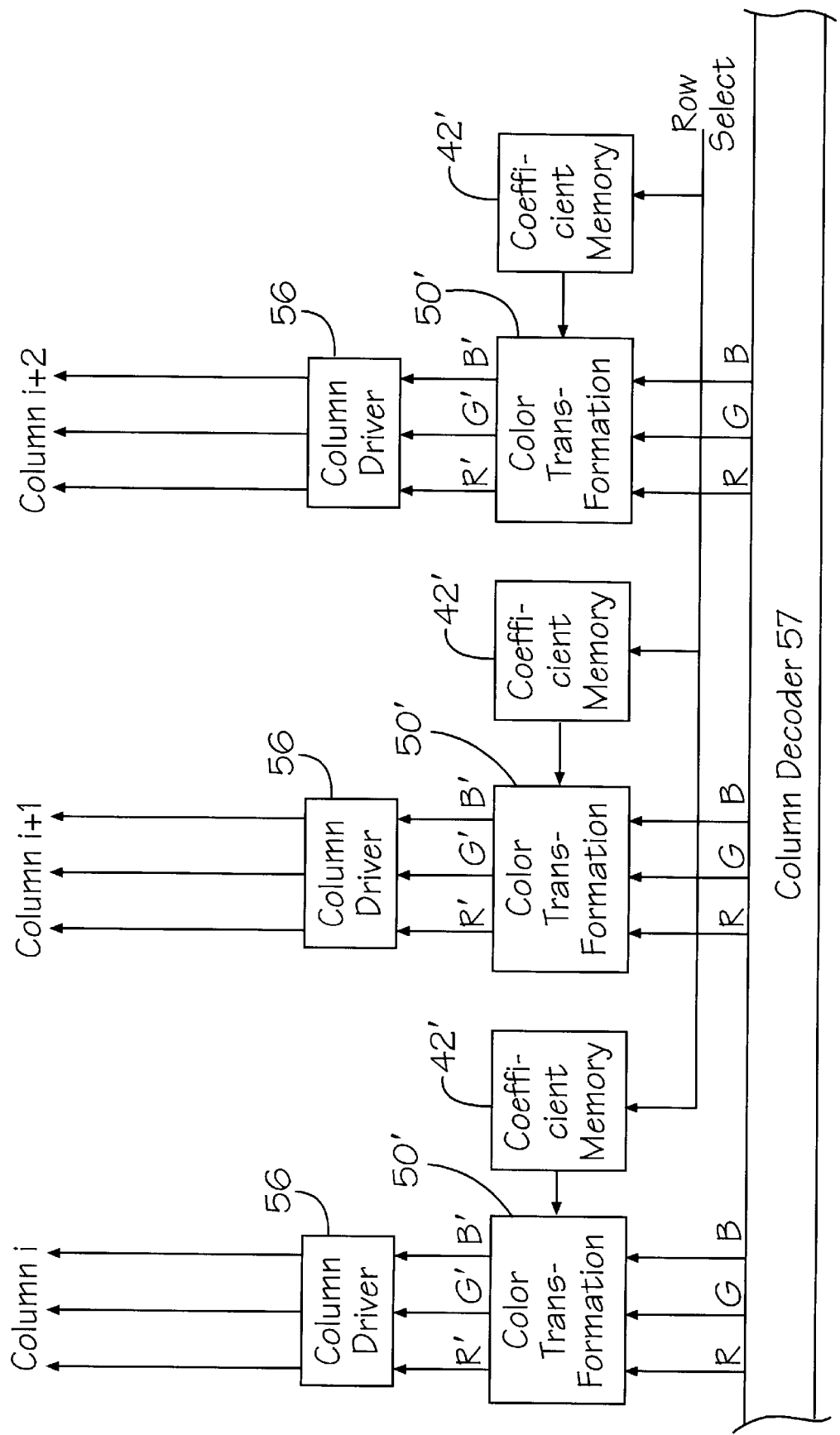
FIG. 9 illustrates one embodiment of the simultaneous chromaticity and luminance correction method of the parallel implementation of Equations (25)–(27) with multiple pixel processors unit and memory sub-system for storing primary chromaticity and luminance data for selected pixels, each located in proximity of the column driver circuit.

With a resolution of 640×480 pixels and 30 frames/sec there would be 108 ns to solve the linear system of equations, assuming that corrections are done for every pixel. With a column parallel implementation shown in FIG. 9, this time increases to 52 $\mu$s. In this parallel embodiment, multiple pixel color processors 50' operate in parallel on an entire row of pixels. Multiple memory units 42' are used for storing chromaticity and luminance data for pixels. The implementation in FIG. 9 uses one color processor 50' per column driver 56 as an illustrative example only. Uncorrected pixel data (R, G, and B) is passed from the column decoder 57 to each of the color processors 50'. They perform the color transformations in parallel for an entire row of pixels and pass the corrected data, R', G' and B', to the column driver circuits 56. The latter send the corrected pixel data to the row of pixels selected by the row driver circuits, not shown. More time for the computations may be available, if corrections are done only to selected pixels only. However, it is evident that the fastest dedicated hardware implementations need to be considered in order to able to perform the computations required for this most general case color correction method in real time at full video rates.

Equations (25)–(26) can be considered as an example of set of rules that are applied to the color coordinates (R, G and B) in order to arrive at the corrected set (R', G' and B').

Since the latter do not necessarily need to have mathematically unique values, but rather meet the uniformity perception thresholds of the average human observer as defined above, many other ways for arriving at approximately correct color coordinates can be envisioned. Sequential iterative techniques provide another example and neural network algorithms a third one. Therefore all rule sets that have the objective of matching color or color and brightness in the present sense are considered to be covered.

(vi) Method for Self-Calibration of Color or Color and Brightness Combined

Figure 10:
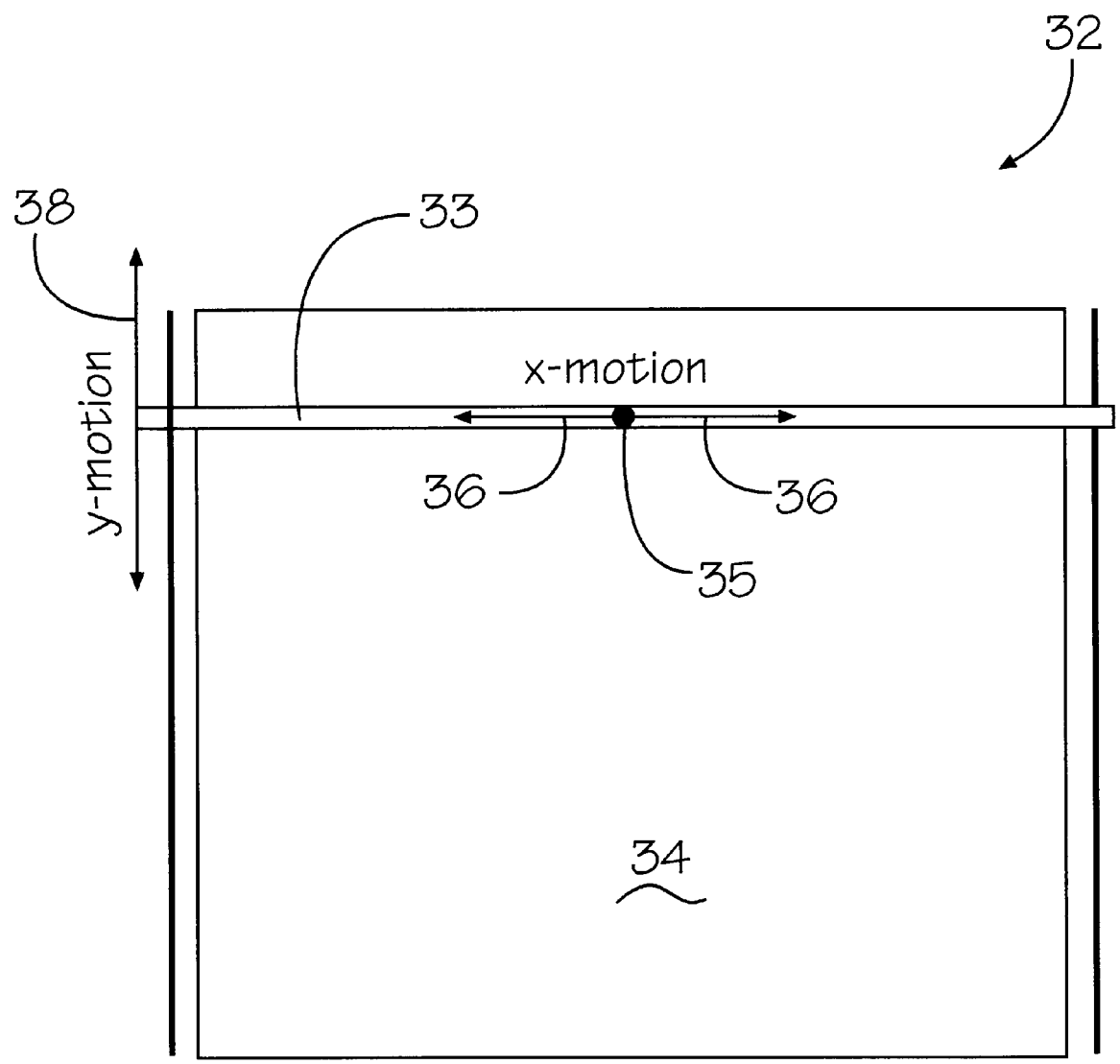
FIG. 10 illustrates a self-calibrating apparatus for color, that is attached to a flat-panel display with the calorimeter mounted on a movable arm in order to provide an x–y pixel scan capability.

The characterization procedures for all the above correction methods can also be performed in the field at end user sites after the display has been in use for some time. Thus, non-uniform aging effects can be compensated for in the same fashion. The same methods can further be used for implementing an automatic self-calibration feature into the display for faithful color or color and brightness reproduction. In that case, referring to FIG. 10, a colorimeter head 35 is mounted on an arm 33 with the scan motion covering the entire pixel array of the display. For example, the calorimeter head 35 can be designed to move along the arm 33 in the horizontal direction, arrows 36, while the arm 33 can be made to move in the vertical direction, arrows 38. The colorimeter arm 33 can be designed to be parked outside the viewable area of the display 34 inside the frame, not shown, when not in use. Using such a movable colorimeter head 35, selected pixels of the display 34 can be turned on and their color element and full pixel characteristics scanned and measured, the reference system selected, color or color and brightness correction parameters computed, and all correction data stored into the memory 42 or 42' (FIGS. 6, 7 and 8) of the display under computer control. Such a self-calibration apparatus can be activated periodically by the display unit itself or initiated by the user to ensure uniform and faithful color or color and brightness characteristics. It should be understood that the apparatus 32 is only one of a number of devices that can be used to perform this calibration function; other devices are therefore to be considered within the scope of the present invention.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for matching tri-stimulus values of pixels in a tiled, flat-panel color video display, the steps comprising:

a) measuring tri-stimulus values of a predetermined set of pixels in a tiled, flat-panel color video display for a predetermined number of pixel excitation conditions, thereby defining a three-dimensional color space for each of said pixels, said color spaces comprising sets of tri-stimulus values representative of each of said pixels' responses to said predetermined excitation conditions;

b) mathematically computing the intersection of at least two of said three-dimensional color spaces, thereby defining a common, resultant three-dimensional color space being the common, intersecting volumes of said at least two three-dimensional color spaces; and c) establishing a color system, operable within said common, resultant three-dimensional color space, for selectively adjusting drive signals to said pixels, whereby identical excitations supplied to each of said pixels results in substantially identical, matched tri-stimulus values.

2. The method for matching tri-stimulus values of pixels in a tiled, flat-panel color video display as recited in claim 1, wherein said color system comprises one from the group of linear color systems and compressed color systems.

3. The method for matching tri-stimulus values of pixels in a tiled, flat-panel color video display as recited in claim 1, wherein said tri-stimulus values comprise absolute CIE tri-stimulus values.

4. The method for matching tri-stimulus values of pixels in a tiled, flat-panel color video display as recited in claim 3, wherein said predetermined number of pixel excitation conditions comprises a predetermined number of unique excitation conditions wherein at least one of the X, Y and Z parameters of said absolute CIE tri-stimulus values is varied for each of said predetermined number of pixel excitation conditions.

5. The method for matching tri-stimulus values of pixels in a tiled, flat-panel color video display as recited in claim 3, wherein said tiled, flat-panel color video display comprises a plurality of individual AMLCD display tiles comprising pixels and having seams therebetween.

6. The method for matching tri-stimulus values of pixels in a tiled, flat-panel color video display as recited in claim 5, wherein said predetermined set of pixels in said tiled, flat-panel color video display comprises pixels selected from at least two of said plurality of individual AMLCD display tiles.

7. The method for matching tri-stimulus values of pixels in a tiled, flat-panel color video display as recited in claim 6, wherein at least one of said predetermined set of pixels in said tiled, flat-panel color video display comprises pixels disposed proximate said seam.

8. The method for matching tri-stimulus values of pixels in a tiled, flat-panel color video display as recited in claim 7, wherein said color video display comprises a tiled, flat-panel display comprising a plurality of individual AMLCD display tiles comprising pixels and having seams therebetween.

9. The method for matching tri-stimulus values of pixels in a tiled, flat-panel color video display as recited in claim 8, wherein said predetermined set of pixels in said tiled, flat-panel color video display comprises pixels selected from at least two of said plurality of individual AMLCD display tiles.

10. The method for matching tri-stimulus values of pixels in a tiled, flat-panel color video display as recited in claim 9, wherein said predetermined set of pixels is substantially representative of all pixels in said display.

11. The method for matching tri-stimulus values of pixels in a tiled, flat-panel color video display as recited in claim 10, the steps further comprising:

e) modifying pixel excitations that create tri-stimulus values outside said resultant, three-dimensional color space so as to produce tri-stimulus values within said resultant, three-dimensional color space.

12. The method for matching tri-stimulus values of pixels in a tiled, flat-panel color video display as recited in claim 11, wherein said produced tri-stimulus values within said resultant, three-dimensional color space are optimized to be substantially on the surface of said resultant, three-dimensional color space.

13. The method for matching tri-stimulus values of pixels in a tiled, flat-panel color video display as recited in claim 6, wherein said predetermined set of pixels is substantially representative of all pixels in said display.

14. The method for matching tri-stimulus values of pixels in a tiled, flat-panel color video display as recited in claim 6, wherein said establishing a color system step (c) comprises determining a set of corrections to be applied to pixel drive signals such that substantially all pixels in said display produce substantially identical tri-stimulus values in response to substantially identical excitations.

15. The method for matching tri-stimulus values of pixels in a tiled, flat-panel color video display as recited in claim 14, the steps further comprising:
   d) modifying pixel excitations that create tri-stimulus values outside said resultant, three-dimensional color space so as to produce tri-stimulus values within said resultant, three-dimensional color space.

16. The method for matching tri-stimulus values of pixels in a tiled, flat-panel color video display as recited in claim 14, the steps further comprising:
   d) operating both said first and said second liquid crystal display tiles substantially simultaneously within said resultant, three-dimensional color space;
   whereby chromaticity and luminance are made substantially uniform across said seam resulting in said seam being substantially visually imperceptible.

17. A method for matching tri-stimulus values of pixels in a tiled, flat-panel color video display, the steps comprising:
   a) characterizing a tiled, flat-panel color video display by measuring tri-stimulus values of a predetermined set of pixels therein for a predetermined number of pixel excitation conditions, thereby defining a three-dimensional color space for each of said pixels, said color spaces comprising discrete sets of tri-stimulus values representative of each of said pixels' responses to said predetermined excitation conditions;
   b) mathematically computing the intersection of at least two of said discrete sets of tri-stimulus values associated with at least two of said three-dimensional color spaces, thereby defining a common, resultant three-dimensional color space being the common, intersecting volumes of said at least two three-dimensional color spaces, said resultant three-dimensional color space being a resultant set of tri-stimulus values;
   c) computing correction coefficients from said at least two sets of tri-stimulus values and said resultant set of tri-stimulus values; and
   d) operating said tiled, flat-panel color video display by applying said correction coefficients to pixel drive signals such that identical drive signals applied to each of said pixels results in substantially identical, matched tri-stimulus values, whereby non-uniformities in chromaticity and luminance are reduced below a perceptual threshold.

18. The method for matching tri-stimulus values of pixels in a tiled, flat-panel color video display as recited in claim 17, wherein said tri-stimulus values comprise absolute CIE tri-stimulus values.

19. The method for matching tri-stimulus values of pixels in a tiled, flat-panel color video display as recited in claim 18, wherein said predetermined number of excitation conditions comprises a predetermined number of unique excitation conditions, wherein at least one of the X, Y and Z parameters of said absolute CIE tri-stimulus values is varied for each of said predetermined number of excitations.

20. A method for substantially eliminating non-uniformities of chromaticity or luminance in a tiled, flat-panel color video display by matching tri-stimulus values of pixels, the steps comprising:
   a) providing a tiled, flat-panel color video display comprising a plurality of pixels each having a sub-pixel associated with a primary color;
   b) selecting at least one reference pixel from said plurality of pixels for matching tri-stimulus values;
   c) characterizing said tiled, flat-panel color video display by measuring tri-stimulus values of said reference pixel and an additional predetermined set of said plurality of pixels for a predetermined number of primary color excitation conditions, thereby defining a three-dimensional color space for said reference pixel and each pixel of said predetermined set of pixels, said color spaces comprising sets of tri-stimulus values representative of each of said predetermined set of pixels' responses to said predetermined excitation conditions, said set of tri-stimulus values for said reference pixel being a reference set of tri-stimulus values;
   d) mathematically computing the intersection of at least two of said discrete sets of tri-stimulus values associated with at least two of said three-dimensional color spaces, thereby defining a common, resultant three-dimensional color space being the common, intersecting volumes of said at least two three-dimensional color spaces, said resultant three-dimensional color space being a resultant set of tri-stimulus values;
   e) storing values representative of selected ones of said tri-stimulus values of primary color excitations, said selected tri-stimulus values falling within said resultant color space;
   f) if said reference pixel has not already been measured, measuring tri-stimulus values of said reference pixel for a predetermined number of primary color excitation conditions, thereby defining a three-dimensional color space for said reference pixel, said color spaces comprising a set of tri-stimulus values representative of each of said reference pixel's response to said predetermined excitation conditions;
   g) computing corrected color coordinates from said sets of tri-stimulus values and said tri-stimulus values associated with said at least one reference pixel; and
   h) operating said tiled, flat-panel color video display by applying drive signals modified in accordance with said corrected color coordinates to said pixels such that identical drive signals applied to each of said pixels results in substantially identical, matched, tri-stimulus values and whereby non-uniformities in chromaticity and luminance are substantially eliminated.

* * * * *